US009497959B1

(12) United States Patent
Peters

(10) Patent No.: US 9,497,959 B1
(45) Date of Patent: Nov. 22, 2016

(54) BIRD DETERRING APPARATUS

(71) Applicant: Graeme Peters, Edmonton (CA)

(72) Inventor: Graeme Peters, Edmonton (CA)

( * ) Notice: Subject to any disclaimer, the term of this patent is extended or adjusted under 35 U.S.C. 154(b) by 0 days.

(21) Appl. No.: 14/937,743

(22) Filed: Nov. 10, 2015

(51) Int. Cl.
*A01M 29/00* (2011.01)
*A01M 29/32* (2011.01)
*A01M 29/06* (2011.01)
*E04B 1/72* (2006.01)

(52) U.S. Cl.
CPC ............. *A01M 29/32* (2013.01); *A01M 29/06* (2013.01); *E04B 1/72* (2013.01)

(58) Field of Classification Search
CPC ....... A01M 29/32; A01M 29/26; E04B 1/72; E04D 13/004
USPC ............................ 119/713, 903; 43/1; 52/101
See application file for complete search history.

(56) References Cited

U.S. PATENT DOCUMENTS

| 2,485,148 | A | * | 10/1949 | Fralin | A01M 29/06 52/101 |
|---|---|---|---|---|---|
| 2,938,244 | A | * | 5/1960 | Christensen | A01M 29/06 256/11 |
| 3,531,900 | A | * | 10/1970 | Vaughn | A01G 13/10 428/907 |
| 4,074,653 | A | * | 2/1978 | Pember | A01M 29/06 116/22 A |
| 4,841,914 | A | * | 6/1989 | Chattan | A01M 29/32 119/903 |
| 4,962,619 | A | * | 10/1990 | Chatten | A01M 29/32 119/903 |
| 5,497,585 | A | * | 3/1996 | Engler | A01M 29/32 52/101 |
| 5,755,179 | A | * | 5/1998 | Webber | A01M 29/32 119/57.8 |
| 5,918,404 | A | * | 7/1999 | Ohba | A01M 29/26 116/22 A |
| 6,003,471 | A | * | 12/1999 | Ohba | A01M 29/26 119/713 |
| 6,367,419 | B1 | * | 4/2002 | Gosselin | A01M 29/32 119/57.8 |
| 6,550,409 | B1 | * | 4/2003 | Smith | B63B 21/12 114/221 R |
| 6,640,506 | B2 | * | 11/2003 | Landers | A01M 29/06 43/1 |
| 6,775,950 | B2 | * | 8/2004 | Donoho | A01M 29/32 119/713 |
| 7,040,058 | B2 | * | 5/2006 | Finkelstein | A01M 29/32 52/101 |
| 8,162,292 | B2 | * | 4/2012 | Farmer | A01K 3/00 160/242 |
| 8,479,456 | B1 | * | 7/2013 | Donoho | E04B 1/72 43/1 |
| 8,689,498 | B2 | * | 4/2014 | Donoho | E04B 1/72 43/1 |
| 9,232,782 | B2 | * | 1/2016 | Martinez Carrasco | A01M 29/06 |
| 2010/0201525 | A1 | * | 8/2010 | Bahat | A01M 29/10 340/573.2 |

* cited by examiner

*Primary Examiner* — Yvonne Abbott-Lewis
(74) *Attorney, Agent, or Firm* — David W. Barman

(57) ABSTRACT

The invention is an assembly for discouraging flying creatures from approaching and/or landing including a housing with a base, a shaft, a shaft mount, a spindle associated with the shaft, a means of turning the spindle, and an actuator.

6 Claims, 7 Drawing Sheets

SECTION "A-A" OF FIG.2
IN "ROTATING" POSITION

SECTION "A-A" OF FIG.2
IN "NONROTATING" POSITION

SECTION "A-A" OF FIG.2
IN "ROTATING" POSITION

SECTION "A-A" OF FIG.2
IN "NONROTATING" POSITION

BIRD DETERRING APPARATUS

BACKGROUND OF THE INVENTION

There are many instances where unwanted birds and other flying creatures are undesirable around buildings and other such structures. While it is desirable to prevent the birds from landing on these structures, most persons do not wish to cause the birds harm. The present invention addresses this by providing a device that provides motion when birds are present and discourages the birds from landing or otherwise maintaining a position in the area.

SUMMARY OF THE INVENTION

In one embodiment, the present invention is an assembly for discouraging flying creatures from approaching and/or landing, said assembly comprising: a housing with a base; a shaft emanating from said base; a shaft mount; a spindle associated with said shaft; a means of turning said spindle; and an actuator.

In one embodiment, the shaft has one or more surface features emanating outward from a central shaft axis.

In one embodiment, the actuator is a motion sensor, a physical touch sensor, or combinations thereof.

In one embodiment, the means of turning said spindle is a motor.

In one embodiment, the means of turning said spindle is a motor supplied with electrical power from a battery, electrical power from a wired power source, electrical power from a solar cell, mechanical power from a spring loaded mechanism, or combinations thereof.

In one embodiment, the present invention consists of an assembly for discouraging flying creatures from approaching and/or landing, the assembly having: a housing with a base; a shaft configured as a vertical pinwheel emanating from said base; a shaft mount; a spindle positioned inside the interior of the shaft; a electrical motor turning said spindle; and an actuator being motion sensor, physical touch sensor, or combinations thereof.

In one embodiment, the present invention is an assembly for discouraging flying creatures from approaching or landing, the assembly consisting of: a housing with a base; a shaft configured as a vertical pinwheel emanating from said base; a shaft mount; a spindle positioned inside the interior of the shaft; a electrical motor turning said spindle; and an actuator being motion sensor, physical touch sensor, or combinations thereof.

DETAILED DESCRIPTION OF THE PREFERRED EMBODIMENT

Figure 1:
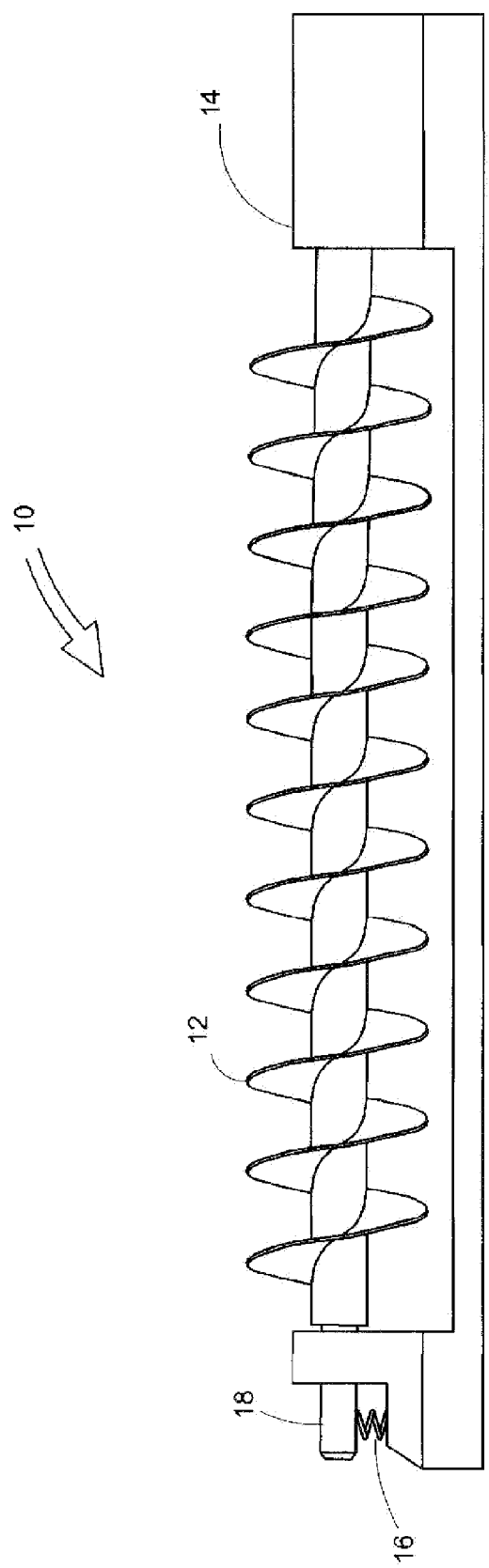
FIG. 1 is a front view of the assembly according to one embodiment of the present invention.
Figure 2:
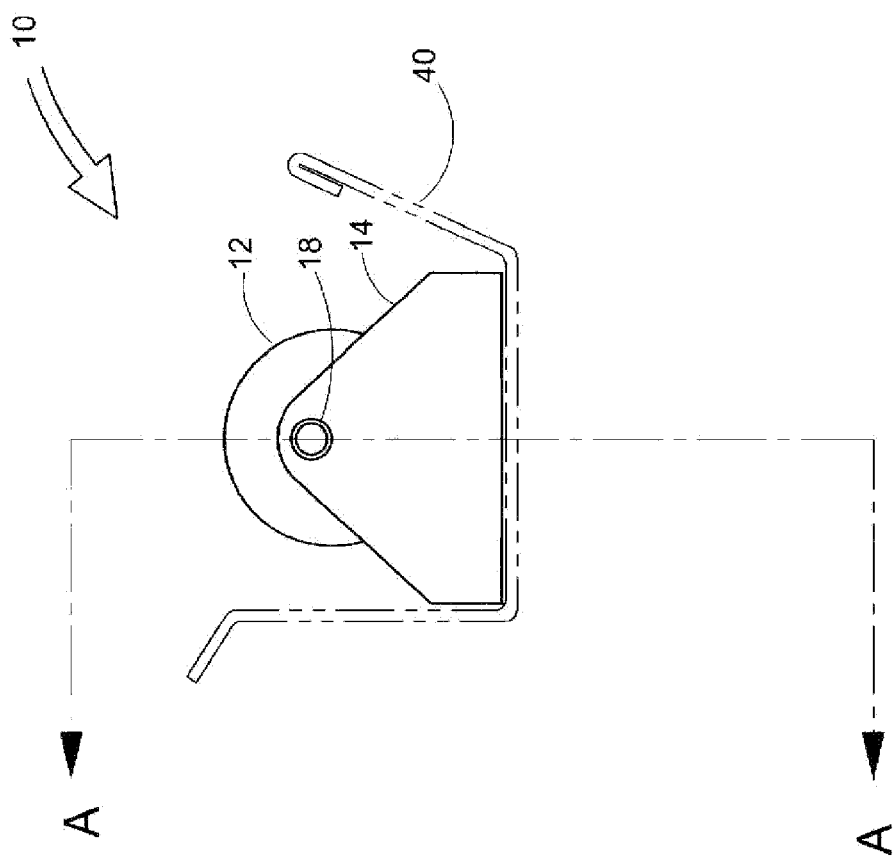
FIG. 2 is a side view according to one embodiment of the present invention.
Figure 3:
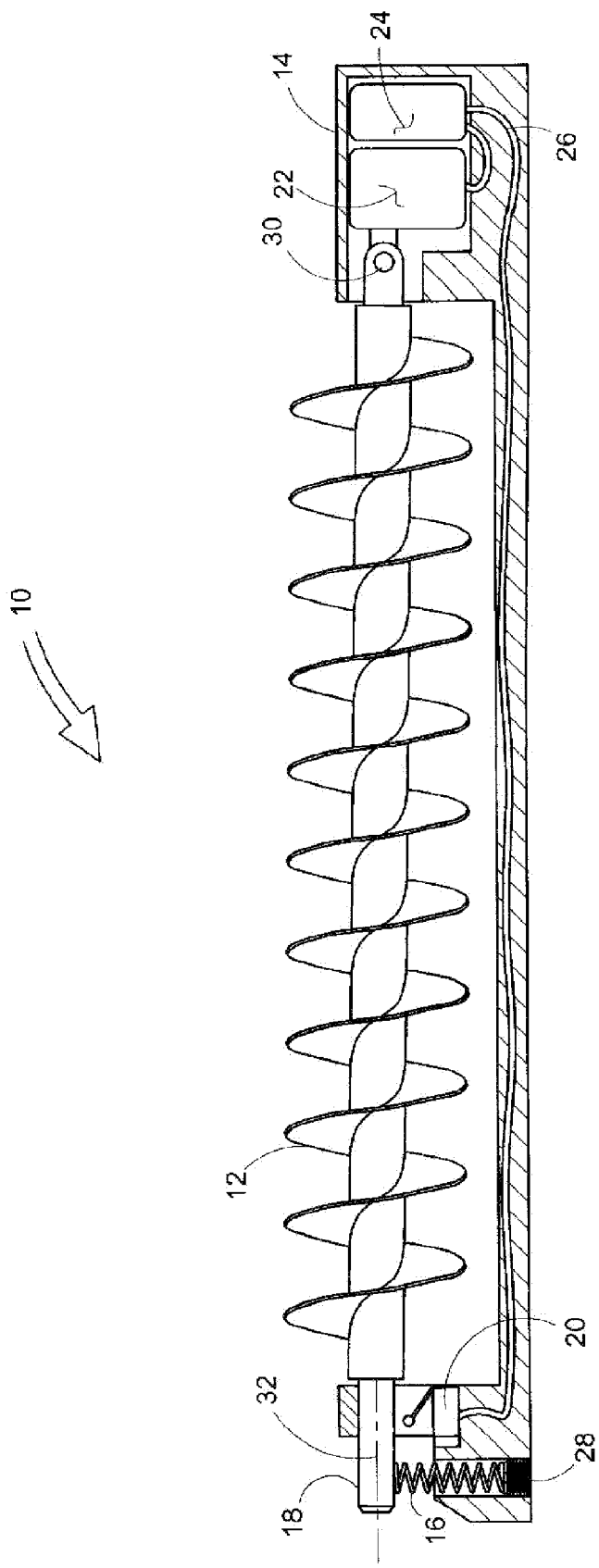
FIG. 3 is a sectional view along section lines A-A from FIG. 2 according to one embodiment of the present invention.

As generally understood, the present invention is a device constructed and arranged to impart movement and discourage birds and other flying creatures from coming close. Assembly 10 has housing 14 constructed and arranged to hold rotating spindle 12. Rotating spindle 12 rotates about a central shaft 18. In one embodiment, system 10 includes activating spring 16 operatively associated with a spring tension adjusting screw 28. Spring 16 urges shaft 18 outward from housing 14. When spindle 12 and/or shaft 18 is moved, switch 20 activates, whereby switch 20 is operatively associated with motor 22 and a power source 24. Motor 22, when actuated, rotates shaft 18 and subsequently spindle 12. In one embodiment, switch 20 is associated with motor 22 through a physical wire connection 26. In an alternative embodiment, not shown, association can be through a wireless signal.

Figure 4:
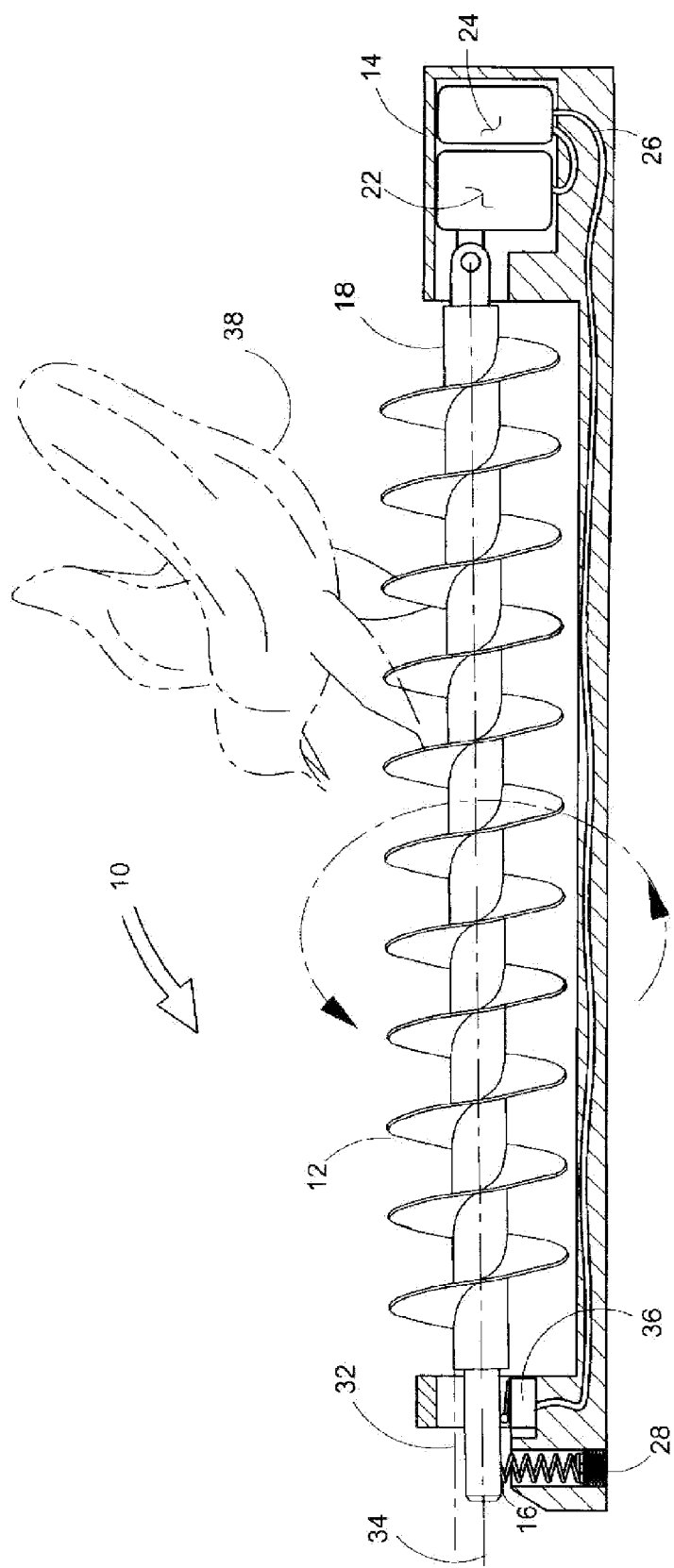
FIG. 4 is a sectional view along section lines A-A demonstrating rotational movement of the article according to one embodiment of the present invention.
Figure 5:
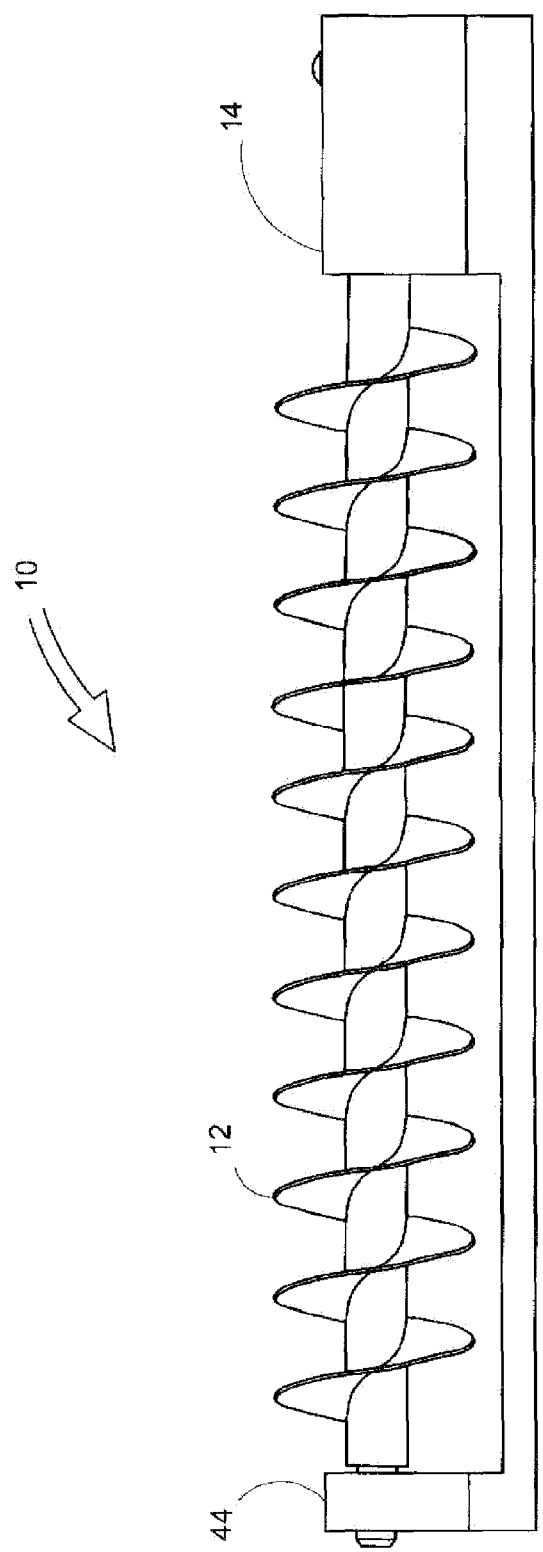
FIG. 5 is a front view according to one embodiment of the present invention incorporating a motion sensor.

As demonstrated in FIG. 4, when a bird 38 or other object touches spindle 12, switch 20 moves into a closed position actuating circuit 36. Centerline 32 represents the center position of shaft 18 in a resting or non-actuated position.

Centerline 34 is demonstrative of shaft 18 moved into an actuating position. In actuating position, each of shaft 18 and spindle 12 rotate.

Figure 6:
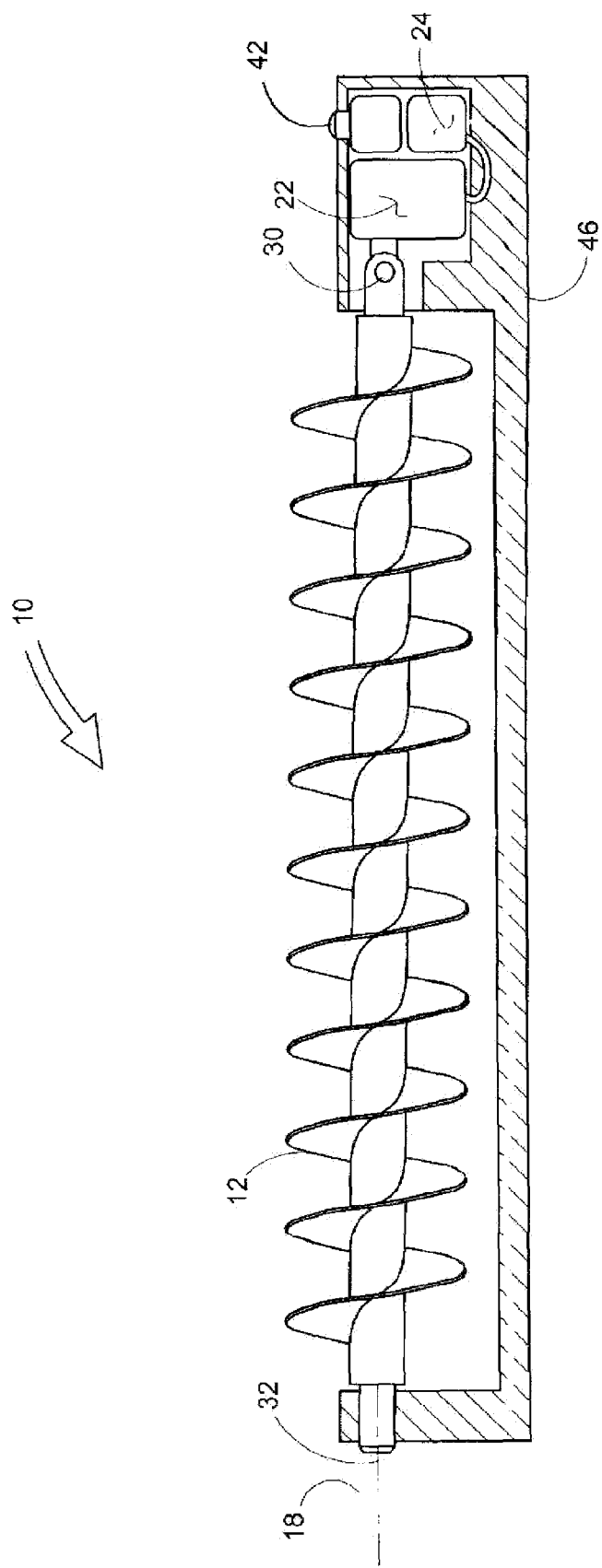
FIG. 6 is a sectional view along section lines A-A from FIG. 2 in a non-rotating position.
Figure 7:
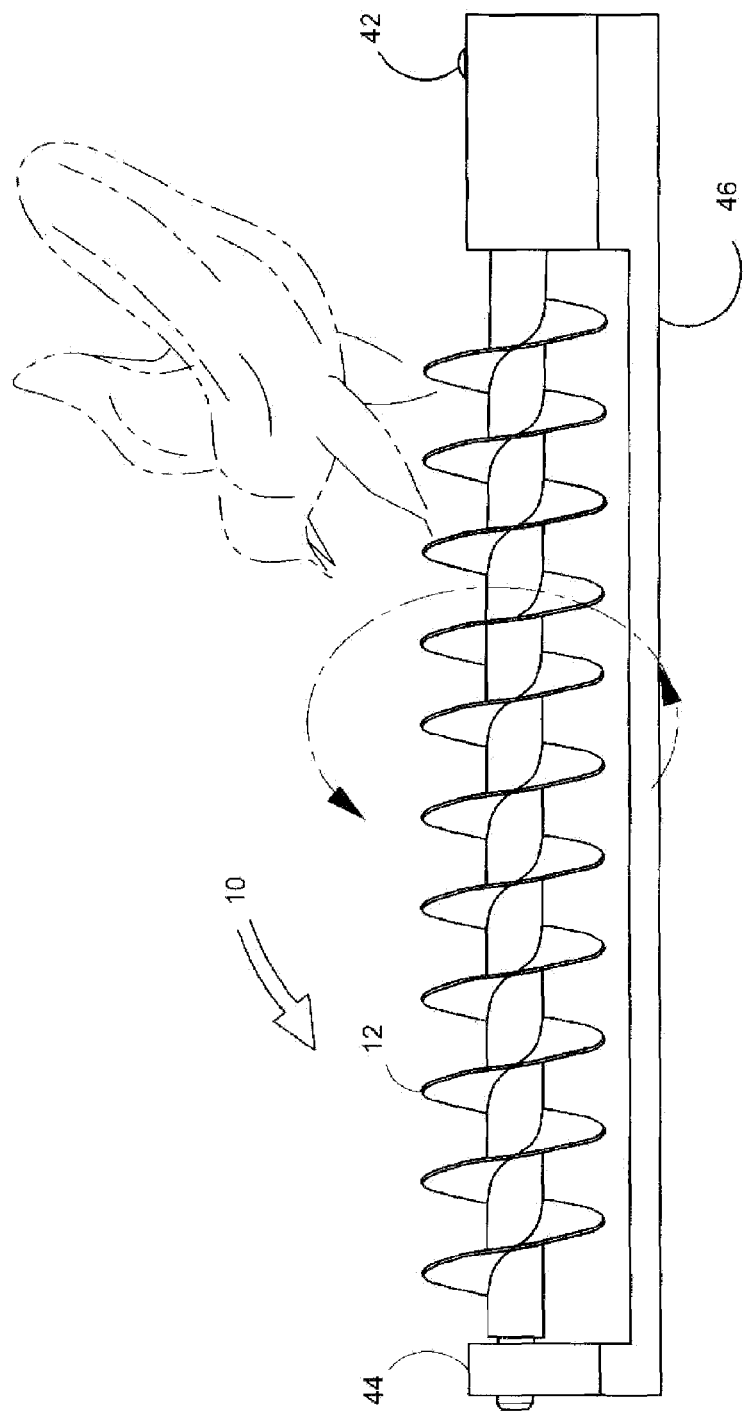
FIG. 7 is a front view of the assembly according to the present invention demonstrative of rotational movement.

In another embodiment, system 10 includes motion sensor 42. Although motion sensor 42 is shown in a particular configuration in FIGS. 6 and 7, placement of motion sensor 42 is not limited to the particular embodiment illustrated. Motion sensor 42 serves as the actuator for rotational turning of shaft 18 and spindle 12. When a bird approaches system 10, motion sensor 42 detects the motion of bird 38 and begins rotational movement of shaft 18 and spindle 12.

In a preferred embodiment, spindle 12 has a pinwheel configuration as demonstrated in the figures. In this preferred embodiment, the pinwheel configuration presents not only rotational motion to discourage birds and other flying organisms from approaching and/or landing on system 10, but pinwheel configuration is used to create an illusion of movement along the horizontal shaft 18, further discouraging a bird from landing thereon.

The present invention contemplates motion to the motor being battery, electrical, solar, mechanical (e.g. wind up or other mechanical methods), or combinations thereof.

The drawings show a particular embodiment. One embodiment utilizes any desired geometric configuration to deter birds. A particular embodiment, as defined in the figures uses what will be referred to as a vertical pinwheel. In this embodiment, the motion not only is rotational, but provides a moving spiral to further deter birds.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. An assembly for discouraging flying creatures from approaching or landing, said assembly comprising: a housing with a base; a shaft emanating from said base; a shaft mount; a spindle associated with said shaft; a means of turning said spindle; and an actuator.

2. The assembly of claim 1 wherein shaft has one or more surface features emanating outward from a central shaft axis.

3. The assembly of claim 1 wherein said actuator is a motion sensor, a physical touch sensor, or combinations thereof.

4. The assembly of claim 1 wherein said means of turning said spindle is a motor.

5. The assembly of claim 1 wherein said means of turning said spindle is a motor supplies with electrical power from a battery, electrical power from a wired power source, electrical power from a solar cell, mechanical power from a spring loaded mechanism, or combinations thereof.

6. An assembly for discouraging flying creatures from approaching or landing, the assembly consisting of: a housing with a base; a shaft configured as a vertical pinwheel emanating from said base; a shaft mount; a spindle positioned inside the interior of the shaft; a electrical motor turning said spindle; and an actuator being motion sensor, physical touch sensor, or combinations thereof.

* * * * *